March 14, 1944.  E. J. HARDING  2,344,143
DEPTH GAUGE, COUNTERSINK AND DRILL
Filed Aug. 24, 1942
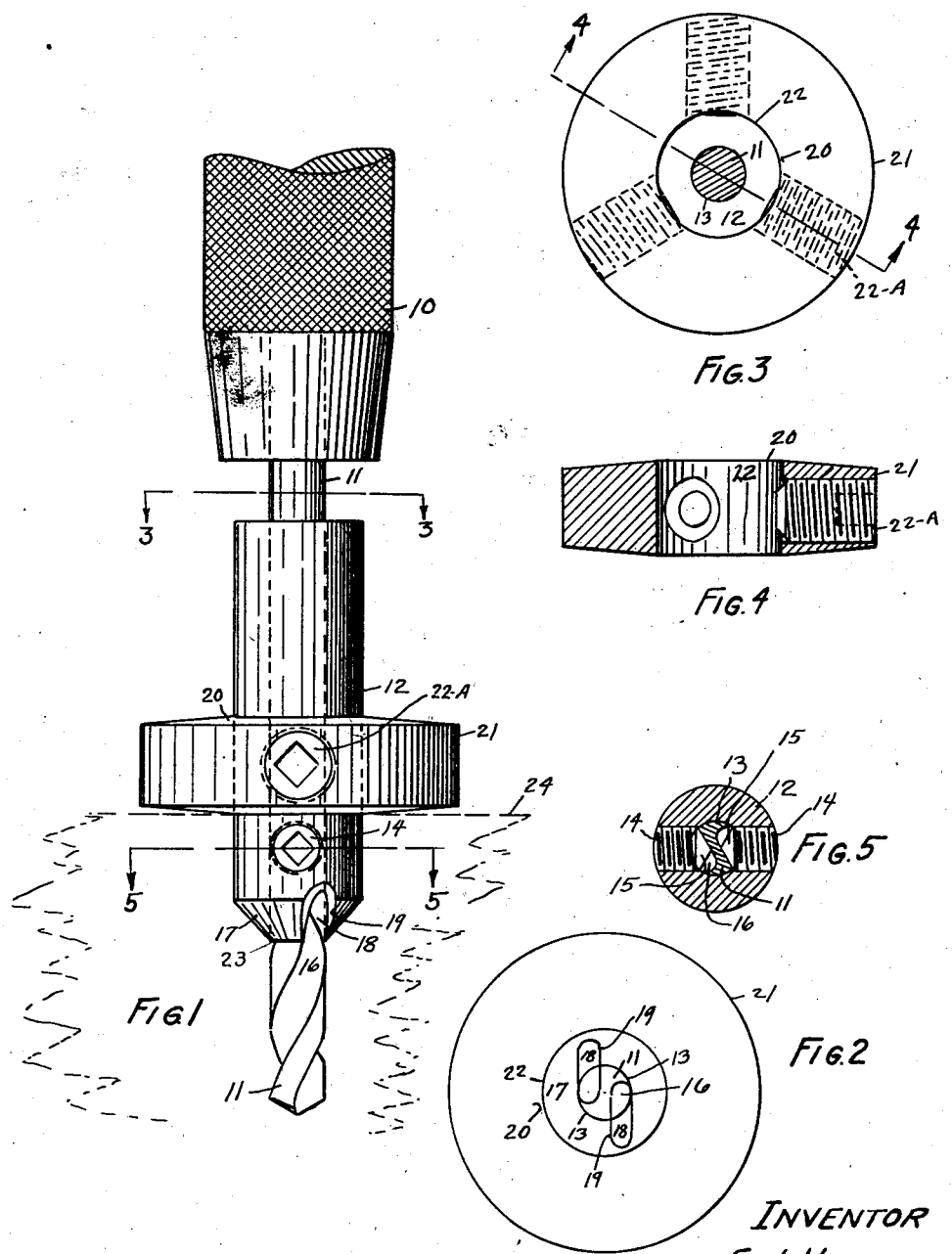
INVENTOR
E. J. HARDING.
BY 
ATTORNEY.

Patented Mar. 14, 1944

2,344,143

UNITED STATES PATENT OFFICE 2,344,143

DEPTH GAUGE, COUNTERSINK, AND DRILL

Ernist J. Harding, Portland, Oreg.

Application August 24, 1942, Serial No. 455,863

1 Claim. (Cl. 7—1)

This invention relates generally to the wood working art and particularly to a combined drill, countersink and depth gauge.

The main object of this invention is to expedite the drilling and countersinking of holes where large quantities of screws are to be installed.

The second object is to insure complete uniformity in the depth of the drilled holes with relation to the head of the screw to be inserted therein.

The third object is to make it possible to countersink the screw to the maximum depth, thereby making it possible to obtain the greatest holding power on the shortest possible screw.

These and other objects are accomplished in the manner set forth in the following specification, as illustrated in the accompanying drawing, in which:

Fig. 1 is a side elevation of my device showing same in use, in which the wood is broken away in cross section.

Fig. 2 is an end view of Fig. 1.

Fig. 3 is a transverse section taken along the line 3—3 in Fig. 1.

Fig. 4 is a section taken along the line 4—4 in Fig. 3.

Fig. 5 is a section taken along the line 5—5 of Fig. 1.

Similar numerals refer to similar parts throughout the several views.

Referring in detail to the drawing, there is shown the usual form of drill chuck 10 into which is inserted a drill 11 especially adapted for drilling in wood.

Referring particularly to my invention, same will be seen to consist of a tubular shell 12 having a central opening 13 adapted to receive the drill 11. Into the opening 13 project the two set screws 14 whose points 15 engage the flutes 16 of the drill 11, and serve to position the sleeve 12 longitudinally on the drill as well as circumferentially.

The end 17 of the sleeve 12 farthest from the chuck 10 is made conical and is provided with the two flutes 18 which register with the flutes 16 when the set screws 14 are properly seated. The cutting edges 19 of the flutes 18 form the countersink.

On the sleeve 12 is mounted a collar 20 whose outer edge 21 is somewhat narrower than is the body of the collar. The collar 20 is provided with a central opening 22 which freely receives the shell 12. Three set screws 22—A are provided but only one need be operated in order to change the position or secure the collar 20.

In the operation of this device, it is only necessary to determine the depth which the drill 11 should project from the countersink point 23, and position the sleeve 12 accordingly, and then to determine the depth of the countersink and position the collar 20 accordingly, and the device is then ready for use.

The purpose in making the edge 21 of the collar 20 somewhat narrower is to prevent the outer edge from touching the surface 24 of the wood at one point before the drill 11 reaches the required depth. This action would, of course, be undesirable as well as placing a considerable strain on the parts involved.

I claim:

In a device of the class described, the combination of a spirally fluted drill, a tubular shell mounted on said drill, a countersink formed on one end thereof having two diametrically opposite set screws adapted to engage the flutes of said drill, a collar slidably mounted on said shell, said collar having three equidistant set screws therein for positioning same along the length of said shell, the sides of said collar sloping away at a slight angle from the middle portion thereof toward the outer rim which is narrower than is the central portion of the collar, for the purpose of insuring the middle portion of said collar engaging the work before it is engaged by the outer portion should the drill enter the work at a slight inclination.

ERNIST J. HARDING.